Sept. 22, 1942.  W. S. FERGUSON  2,296,432
HIGHWAY GUARD
Filed Dec. 17, 1937  2 Sheets-Sheet 1
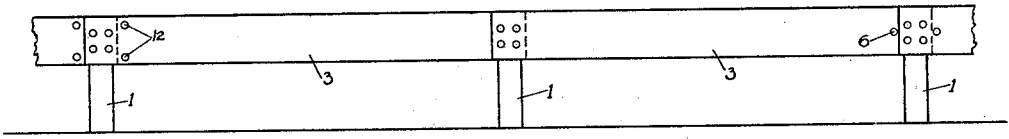
Fig. 1
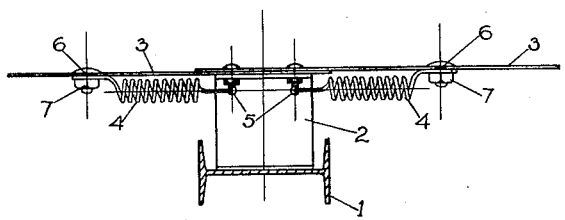
Fig. 2
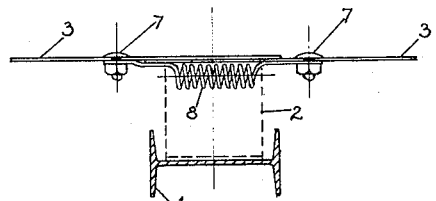
Fig. 3
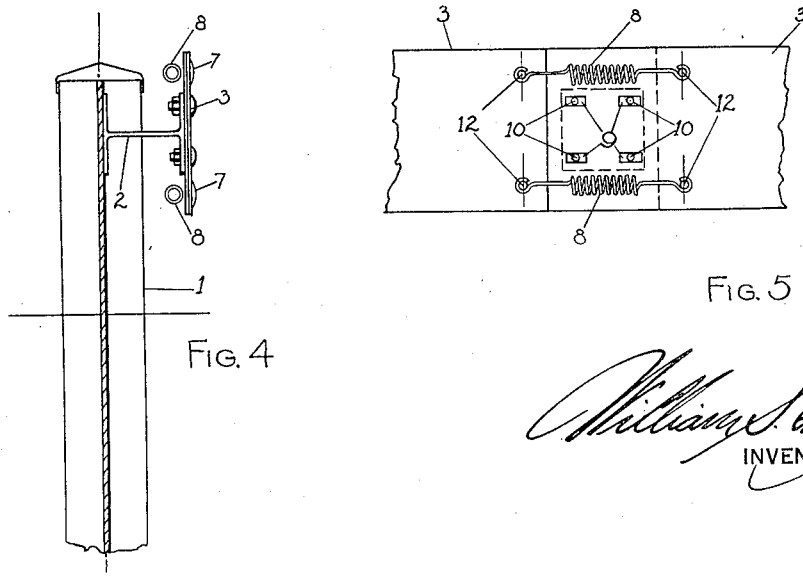
Fig. 4
Fig. 5
William S. Ferguson
INVENTOR Sept. 22, 1942.  W. S. FERGUSON  2,296,432
HIGHWAY GUARD
Filed Dec. 17, 1937  2 Sheets-Sheet 2

William S Ferguson
INVENTOR

Patented Sept. 22, 1942

2,296,432

UNITED STATES PATENT OFFICE 2,296,432

HIGHWAY GUARD

William S. Ferguson, Shaker Heights, Ohio

Application December 17, 1937, Serial No. 180,296

4 Claims. (Cl. 256—13.1)

This invention relates to improvements in highway guards.

Highway guardrails of steel construction in any form whether of the type using flat metal face plates, wire mesh plates or any type naturally tend to expand and contract lengthways of the face strip due to temperature changes. My invention comprises a face plate with a spring or set of springs alone or in combination with other features so placed as to take up or equalize any and all such temperature variations throughout the entire length of the guard rail, at intervals sufficient to assure perfect self alignment without adjustments at all times.

Another object of my invention is to provide a plate and spring assembly which shall also insure increased safety in case of collision with highway vehicles, having a form of construction which permits the springs to take up a portion of the impact before the final shock is fully brought to bear on the plates or the entire structure.

It is a further object of the invention to eliminate any adjustments of face plates or springs during the life of the guard rail. Other advantages shall become apparent as the description proceeds.

It is apparent that my invention, due to contiguity of its parts, precludes any chance of buckling of the face plates and it is an object to have the springs so coupled that the distance between spring end attachments will not allow the columnar action of plates to be in excess of good engineering practice.

The drawings annexed, the description and the following claims, set forth in detail certain features and mechanism embodying the invention, however, I claim equivalent features and materials of construction so long as the spirit of my invention is not violated.

In said annexed drawings:

Fig. 1 is an elevation showing a guard rail embodying the principals of my invention in position on a highway.

Fig. 2 is a plan view of one arrangement of spring assembly showing two springs attached to offset bracket and plates. Special attention is called to the arrangement which provides for each spring being in a plane very close or adjacent to the face plate, thereby eliminating or reducing the probability of the plate buckling.

Fig. 3 is a plan view showing another form of spring assembly not attached to offset brackets. This arrangement of spring may be used either at and in conjunction with offset brackets or at predetermined locations between any set of posts or at any point in the face plate along its installation, in other words, the spring assembly does not necessarily have to be at a post or its supports for face plates.

Fig. 4 is a section showing a post with relation to face plates and spring assembly. This view shows a special type of offset bracket.

Fig. 5 is a rear elevation of face plates showing an alternate form or arrangement of spring assembly as applied to face plates.

Figure 6:
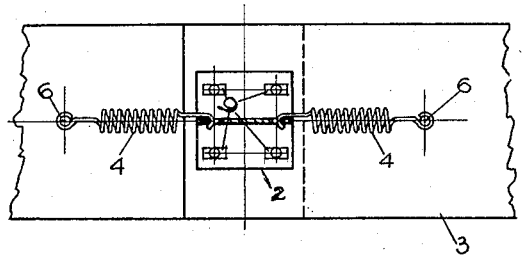

Fig. 6 is an elevation showing the relation of a spring assembly to an offset bracket and face plates.

Figure 7:
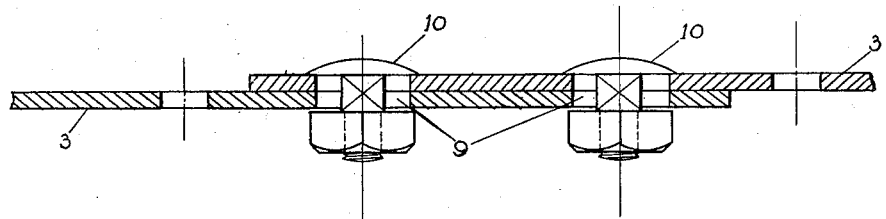

Fig. 7 is a longitudinal section showing the relation of slotted holes in face plates, holes for spring attachments and one method of fastening face plates.

Figure 8:
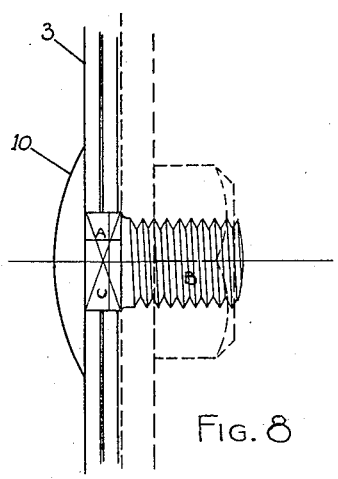

Fig. 8 is a drawing showing bolt 10 or means of fastening adjacent face plates to each other and to a bracket if desired, the portion of length A and width C being square and of a length sufficient to allow or permit face plates 3 to slide on each other at the point of slotted holes 9. Section B is a threaded portion to receive a nut.

Figure 9:
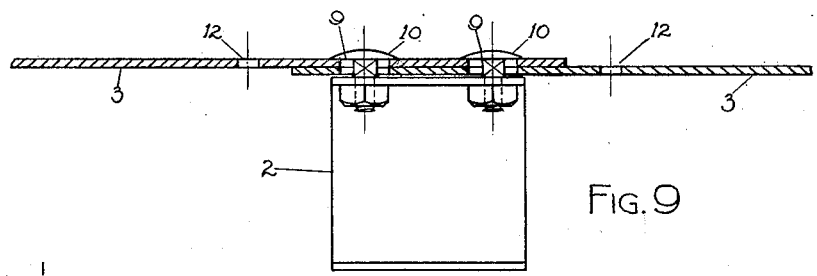

Fig. 9 is a plan view partly in section showing the arrangement of plates when attached to offset brackets.

Referring more particularly to Fig. 1, at the side of the highway are positioned posts 1 which in one aspect of my invention may be of any material spaced at a suitable distance from center to center which in turn support the face plates 3 by means of offset brackets 2 or the plates might be fastened directly to the posts. The brackets 2 when attached to posts 1 as in Fig. 2 form an anchor in one instance for one end of springs 4 which hook or fasten into holes 5. Fig. 2 shows face plates 3 which overlap each other at the offset brackets 2 and plates 3 are provided with holes 6 to allow a bolt fastening 7 or other suitable means. Fig. 3 shows face plates 3 which overlap each other at slotted holes either at an offset bracket 2 to which the plates are attached or the plates may be attached to each other at certain predetermined intervals between posts 1. Whenever the arrangement of offset brackets 2 provides for a connection that will permit the face plate 3 to extend for more than one panel or bay by allowing a movement of face plates 3 at the offset bracket 2, the spring assembly may be attached to the face plates 3 at such point or points using the same arrangement of spring 8 as shown in Fig. 3, Fig. 4 and Fig. 5. Holes 12 are provided for attachments 7.

Fig. 4 refers more particularly to the location of springs 8 with reference to face plate 3 when springs 8 are not directly attached to offset brackets 2.

Fig. 5 refers particularly to face plate 3 which provides slotted holes 9 to allow for elongation and contraction take up after erection. Bolts 10 are for the purpose of joining the face plates 3 and/or connecting face plates to offset brackets 2 or post 1. Face plates 3 are also provided with holes 12 for spring attachments 7.

In Figs. 5 and 6 the nuts have been left off bolts 10 for clearness.

Bolts 10, Fig. 7, are constructed to permit the face plates 3 to slide over each other and, where attached to offset brackets 2, to permit the plates to slide on offset brackets or posts.

The face plates 3 incorporated in my invention are provided with a determined number of slotted holes 9 on one end of the plate and a determined number of holes to fit the size of bolts or rivets on the other or fixed end. This arrangement will permit the plates when joined together at their slotted ends to slide on or against each other and allow or permit the spring assembly to compensate for temperature changes. This arrangement also allows the springs to take up the original shock due to collision for such a distance as the slotted holes 9 provide movement until the plates contact the bolts 10 and begin to resist the force by tension in themselves. The same end arrangement of slotted and fixed holes, may be provided by welding end pieces or other means to any other form of face plates. I, therefore, intend to claim any equivalent of construction so long as the spirit is the same.

It will be noted that I have shown metal posts and offset brackets of ductile metal. This construction, combined with my novel mounting of face plates or guard rails, gives a very efficient shock-absorbing structure. It will be noted from Fig. 1 that with springs connected at the points 6 and 12 each plate or guard rail is under spring tension, that is to say, the springs 8 are placed along the guard so that some springs are always near the point where collision occurs. When a vehicle collides with my improved guard, the first shock is absorbed by the nearest springs 8 until the play in slots 9 has been taken up. The pull on the first-engaged plates 3 is then transmitted both to attached plates 3 further along the guard and to their springs 8 and also to the ductile metal brackets 2. If the brackets bend, the posts 1 firmly absorb the shock and carry it to the ground. Thus the shock is resisted progressively by greater forces until the entire guard, throughout whatever length is necessary, is called into play to resist the collision.

There are many forms of guard plates and offset brackets now on the market, however, the specific construction of my device as revealed may be adapted to any and I intend to claim the equivalents of my invention adapted in detail to meet conditions.

I, therefore, particularly point out and distinctly claim as my invention:

1. In a highway guard, a post, a bracket secured to said post and offset lateraly from one side thereof, face plates extending longitudinally of the highway and meeting at said bracket in mutual alignment, there being a pin and slot connection between one of said plates and said bracket permitting relative movement between them, and a spring connected between said one plate and said bracket to resist movement of said one plate away from said bracket.

2. In a highway guard, a post, a bracket secured to said post and offset laterally from one side thereof, face plates extending longitudinally of the highway and meeting at said bracket in mutual alignment, the ends of said plates overlapping at said bracket, there being registering slotted openings in said overlapping ends, bolts passing through said openings and securing said plates to said bracket, and spring means urging said plates in overlapping direction.

3. In a highway guard, a post, a bracket secured to said post and offset laterally from one side thereof, face plates extending longitudinally of the highway and meeting at said bracket in mutual alignment, the ends of said plates overlapping at said bracket, there being registering slotted openings in said overlapping ends, bolts passing through said openings and securing said plates to said bracket, and a pair of tension springs, each having one end connected with one of said plates and the other end connected with said bracket to resist movement of said plates longitudinally away from said bracket.

4. Means for supporting a guard rail above a roadway including posts, said guard rail having a combination of face plates fabricated from steel with ends overlapping at one of said posts, means for fastening said plates in juxtaposition permiting them to slide on each other at said overlapping ends, and a tension spring for each plate, each spring attached between its associated plate and said post to resist movement of said plates away from said post.

WILLIAM S. FERGUSON.